United States Patent
Kim et al.

(10) Patent No.: US 10,512,013 B2
(45) Date of Patent: *Dec. 17, 2019

(54) METHOD AND APPARATUS FOR PROCESSING NAS SIGNALING REQUEST IN WIRELESS COMMUNICATION SYSTEM

(71) Applicant: LG ELECTRONICS INC., Seoul (KR)

(72) Inventors: Jaehyun Kim, Anyang-si (KR); Taehyeon Kim, Anyang-si (KR); Li-Hsiang Sun, San Diego, CA (US); Laeyoung Kim, Anyang-si (KR); Sungduck Chun, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,843

(22) Filed: May 8, 2017

(65) Prior Publication Data

US 2017/0245188 A1    Aug. 24, 2017

Related U.S. Application Data

(63) Continuation of application No. 14/995,108, filed on Jan. 13, 2016, now Pat. No. 9,713,055, which is a (Continued)

(51) Int. Cl.
*H04W 4/00* (2018.01)
*H04W 36/16* (2009.01)
(Continued)

(52) U.S. Cl.
CPC ....... *H04W 36/165* (2013.01); *H04L 41/0654* (2013.01); *H04W 24/04* (2013.01);
(Continued)

(58) Field of Classification Search
CPC ............................ H04W 36/165; H04W 60/04
See application file for complete search history.

(56) References Cited

U.S. PATENT DOCUMENTS

2008/0268842 A1*  10/2008  Herrero-Veron ........ H04W 8/06
                                                                 455/435.1
2009/0086667 A1    4/2009  Sitomaniemi et al.
(Continued)

FOREIGN PATENT DOCUMENTS

CN    1316866    10/2001
CN    1720677    1/2006
(Continued)

OTHER PUBLICATIONS

Huawei, et al., "EMM NAS level rejection for APN based congestion control," 3GPP TSG-CT WG1 Meeting #67, C1-103696, Oct. 2010, 24 pages.
(Continued)

*Primary Examiner* — Clemence S Han
(74) *Attorney, Agent, or Firm* — Lee Hong Degerman Kang & Waimey

(57) ABSTRACT

The present invention relates to a wireless communication system, and more particularly, to a method and an apparatus for processing a NAS signaling request. A method for performing a non-access stratum (NAS) signaling process by means of a terminal in a wireless communication system according to one embodiment of the present invention comprises: a step of receiving a first message that includes information indicating a network failure from a network node of a first network; a step of starting a timer relating to a network selection; and a step of selecting a second network from among network candidates excluding the first network during the operation of the timer relating to a network selection.

6 Claims, 6 Drawing Sheets

Related U.S. Application Data continuation of application No. 14/559,702, filed on Dec. 3, 2014, now Pat. No. 9,271,172, which is a continuation of application No. 14/365,054, filed as application No. PCT/KR2013/002192 on Mar. 18, 2013, now Pat. No. 8,934,334.

(60) Provisional application No. 61/612,204, filed on Mar. 16, 2012, provisional application No. 61/619,917, filed on Apr. 3, 2012, provisional application No. 61/645,633, filed on May 11, 2012.

(51) Int. Cl.
| | | |
|---|---|---|
| *H04W 24/04* | (2009.01) | |
| *H04L 12/24* | (2006.01) | |
| *H04W 48/16* | (2009.01) | |
| *H04W 60/04* | (2009.01) | |
| *H04W 48/18* | (2009.01) | |
| *H04W 84/04* | (2009.01) | |
| *H04W 88/06* | (2009.01) | |

(52) U.S. Cl.
CPC .......... *H04W 48/16* (2013.01); *H04W 60/04* (2013.01); *H04W 48/18* (2013.01); *H04W 84/042* (2013.01); *H04W 88/06* (2013.01)

(56) References Cited

U.S. PATENT DOCUMENTS

| | | | |
|---|---|---|---|
| 2009/0124249 A1 | 5/2009 | Young et al. | |
| 2010/0075658 A1 | 3/2010 | Hou et al. | |
| 2010/0165940 A1 | 7/2010 | Watfa et al. | |
| 2010/0234026 A1 | 9/2010 | Tenny et al. | |
| 2010/0240338 A1* | 9/2010 | Mallick | H04W 4/90 455/404.1 |
| 2010/0255836 A1* | 10/2010 | Chen | H04W 48/18 455/426.1 |
| 2010/0297979 A1* | 11/2010 | Watfa | H04W 8/205 455/404.1 |
| 2011/0216732 A1* | 9/2011 | Maeda | H04W 4/08 370/329 |
| 2012/0002545 A1* | 1/2012 | Watfa | H04W 48/06 370/235 |
| 2012/0063392 A1 | 3/2012 | Sitomaniemi et al. | |
| 2012/0082029 A1 | 4/2012 | Liao | |
| 2012/0083245 A1* | 4/2012 | Adjakple | H04W 4/08 455/411 |
| 2012/0115454 A1* | 5/2012 | Liao | H04W 60/02 455/418 |
| 2012/0170548 A1 | 7/2012 | Rajagopalan et al. | |
| 2012/0178449 A1* | 7/2012 | Liao | H04W 60/00 455/435.2 |
| 2012/0178457 A1* | 7/2012 | Liao | H04W 76/18 455/437 |
| 2012/0218889 A1* | 8/2012 | Watfa | H04W 60/04 370/230 |
| 2012/0225670 A1 | 9/2012 | Cheng | |
| 2012/0269122 A1 | 10/2012 | Lee | |
| 2012/0307703 A1 | 12/2012 | Young et al. | |
| 2013/0012204 A1 | 1/2013 | Kim et al. | |
| 2013/0039244 A1* | 2/2013 | Sun | H04W 52/0235 370/311 |
| 2013/0107863 A1* | 5/2013 | Faccin | H04W 36/0022 370/331 |
| 2013/0128787 A2 | 5/2013 | Young et al. | |
| 2013/0136115 A1* | 5/2013 | Moisanen | H04W 76/18 370/338 |
| 2013/0203411 A1* | 8/2013 | Cheng | H04W 48/18 455/435.1 |
| 2013/0231105 A1* | 9/2013 | Bai | H04W 48/18 455/426.1 |
| 2013/0316699 A1* | 11/2013 | Jheng | H04W 48/18 455/423 |
| 2014/0099969 A1* | 4/2014 | Hwang | H04W 48/06 455/453 |
| 2015/0003228 A1* | 1/2015 | Choi | H04W 76/028 370/216 |
| 2016/0135101 A1 | 5/2016 | Kim et al. | |

FOREIGN PATENT DOCUMENTS

| | | |
|---|---|---|
| EP | 2346287 | 11/2004 |
| EP | 2306775 | 4/2011 |
| EP | 2477449 | 7/2012 |
| JP | 2007-511143 | 4/2007 |
| KR | 1020110045764 | 5/2011 |
| WO | 2011/097534 | 8/2011 |
| WO | 2011/100596 | 8/2011 |

OTHER PUBLICATIONS

European Patent Office Application Serial No. 13761193.5, Search Report dated Nov. 19, 2015, 10 pages.

Research in Motion, "Handling of ongoing lms calls in Ra or Ta change and Handover Restriction List management," 3GPP TSG CT WG1 Meeting #68, C1-104520, Nov. 2010, 9 pages.

3rd Generation Partnership Project (3GPP), "Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 9)," 3GPP TS 36.523-1 V9.7.0, Dec. 2011, 2 pages.

State Intellectual Property Office of the People's Republic of China Application Serial No. 201380006677.X, Office Action dated May 15, 2017, 20 pages.

3rd Generation Partnership Project (3GPP), "Technical Specification Group Core Network and Terminals; Non-Access-Stratum (NAS) protocol for Evolved Packet System (EPS); Stage 3 (Release 11)," 3GPP TS 24.301 V11.1.0, Dec. 2011, 327 pages.

3rd Generation Partnership Project (3GPP), "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.1.0, Mar. 2012, 285 pages.

* cited by examiner

METHOD AND APPARATUS FOR PROCESSING NAS SIGNALING REQUEST IN WIRELESS COMMUNICATION SYSTEM

CROSS-REFERENCE TO RELATED APPLICATIONS

This application is a continuation of U.S. patent application Ser. No. 14/995,108, filed on Jan. 13, 2016, now U.S. Pat. No. 9,713,055, which is a continuation of U.S. patent application Ser. No. 14/559,702, filed on Dec. 3, 2014, now U.S. Pat. No. 9,271,172, which is a continuation of U.S. patent application Ser. No. 14/365,054, filed on Jun. 12, 2014, now U.S. Pat. No. 8,934,334, which is the National Stage filing under 35 U.S.C. 371 of International Application No. PCT/KR2013/002192, filed on Mar. 18, 2013, which claims the benefit of U.S. Provisional Application Nos. 61/612,204, filed on Mar. 16, 2012, 61/619,917, filed on Apr. 3, 2012, and 61/645,633, filed on May 11, 2012, the contents of which are all hereby incorporated by reference herein in their entirety.

TECHNICAL FIELD

The following description relates to a wireless communication system and, more particularly, to a method and apparatus for processing a non-access stratum (NAS) signaling request.

BACKGROUND ART

NAS corresponds to the highest stratum of a control plane between user equipment (UE) and a network node (e.g. mobility management entity (MME)) in a wireless communication system. NAS protocols include protocols for mobility management (NN) and session management (SM) between the UE and MME. For example, evolved packet system (EPS) MMM (EMM) protocol can provide procedures for controlling UE mobility and security of NAS protocols. EPS SM (ESM) protocol can include a procedure of processing EPS bearer context and can be used for bearer control provided by an access stratum (AS) and user plane bearer control.

DISCLOSURE

Technical Problem

An object of the present invention devised to solve the problem lies in a method for efficiently processing a NAS signaling request when the NAS signaling request fails or is rejected due to lower layer failure or network failure during a NAS signaling procedure.

The technical problems solved by the present invention are not limited to the above technical problems and those skilled in the art may understand other technical problems from the following description.

Technical Solution

The object of the present invention can be achieved by providing a method for performing a non-access stratum (NAS) signaling procedure by a UE in a wireless communication system, the method including: receiving a first message including information indicating network failure from a network node of a first network; starting a network selection related timer; and selecting a second network from among network candidates other than the first network while the network selection related timer is running.

In another aspect of the present invention, provided herein is a UE performing a NAS signaling procedure in a wireless communication system, including: a transmission and reception module; and a processor, wherein the processor is configured to receive a first message including information indicating network failure from a network node of a first network using the transmission and reception module, to start a network selection related timer and to select a second network from among network candidates other than the first network while the network selection related timer is running.

The following can be commonly applied to the above-described aspects of the present invention.

The first network is may be a public land mobile network (PLMN) providing the information indicating network failure.

The selecting of the second network may include selecting at least one of a radio access technology (RAT) or a PLMN from candidates other than a combination of a RAT and a PLMN providing the information indicating network failure.

The method may further include transmitting, to the network node of the first network, a second message for request of the NAS signaling procedure.

The first message may be a rejection message indicating that the NAS signaling procedure requested through the second message is not granted by a network.

The second message may correspond to one of an attach request message, a tracking area update (TAU) request message, a routing area update (RAU) request message, or a service request message.

The first message may correspond to one of an attach reject message, a TAU reject message, an RAU reject message, or a service reject message.

The method may further include setting an attempt counter to the upper bound thereof when the first message corresponds to one of the attach reject message, the TAU reject message, or the RAU reject message.

A value of the upper bound may be 5.

The update status of the UE may be set to NOT UPDATED.

At least one of a globally unique temporary identifier (GUTI), last visited registered tracking area identity (TAI), key set identifier (KSI) information, or a list of equivalent PLMNs may be deleted.

The UE may be set to EMM-DEREGISTERED.PLMN-SEARCH state

When the UE supports A/Gb mode or Iu mode, at least one of packet temporary mobile subscriber identity (P-TMSI), P-TMSI signature, routing area identity (RAI), or a general packet radio service (GPRS) ciphering key sequence number may be deleted.

The network node may be a mobile management entity (MME).

The above description and the following detailed description of the present invention are exemplary and are for additional explanation of the invention disclosed in the claims.

Advantageous Effects

According to the present invention, it is possible to provide a method for efficiently processing a NAS signaling request when the NAS signaling request fails or is rejected due to lower layer failure or network failure during a NAS signaling procedure.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
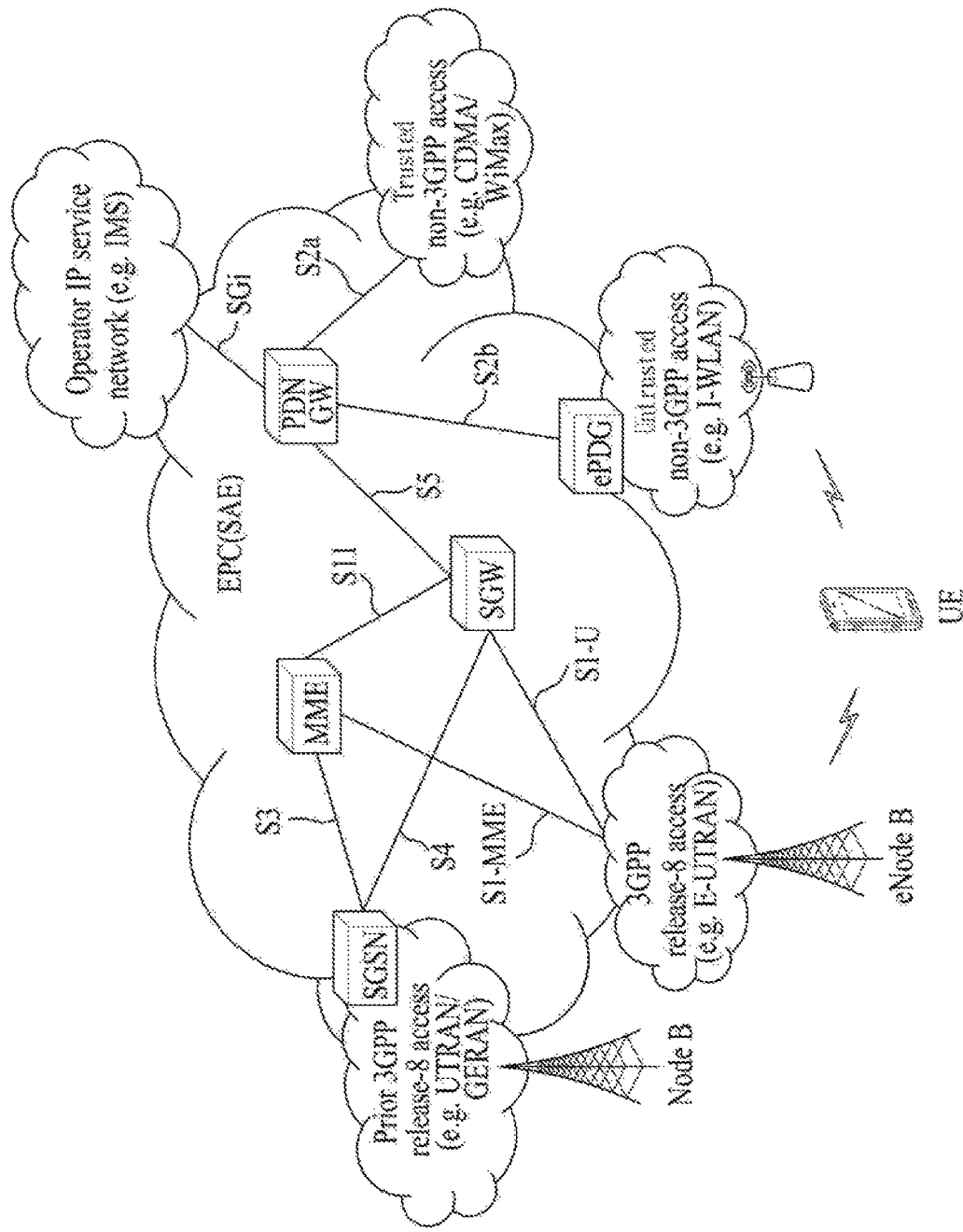
FIG. 1 illustrates a configuration of an EPS including an evolved packet core (EPC)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used for the embodiments of the present invention are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by these documents. Further, all terms as set forth herein can be explained by the standard documents.

The following technology can be used in various wireless communication systems. While the following description is made based on 3GPP LTE and 3GPP LTT-A, the technical scope of the present invention is not limited thereto.

Terms used in the specification are defined as follows.

UMTS (Universal Mobile Telecommunication System): GSM (Global System for Mobile Communication) based third generation mobile communication technology developed by 3GPP EPS (Evolved Packet System): a network system composed of an EPC (Evolved Packet Core) corresponding to an IP based packet switched core network and an access network such as LTE, UTRAN, etc., which evolved from UMTS.

NodeB: an eNB of GERAN/UTRAN which is installed outdoors and has coverage of a macro cell.

eNodeB: an LTE eNB which is installed outdoors and has coverage of a macro cell.

HNB (Home NodeB): CPE (Customer Premises Equipment) providing UTRAN (UMTS Terrestrial Radio Access Network) coverage. Refer to standard document TS 25.467 for details.

HeNB (Home eNodeB): CPE providing E-UTRAN (Evolved-UTRAN) coverage. Refer to standard document TS 36.300 for details.

UE (User Equipment): referred to as a terminal, ME (Mobile Equipment), MS (Mobile Station), etc. The UE may be a portable device such as a notebook computer, cellular phone, PDA (Personal Digital Assistant), smartphone, multimedia device, etc. or a fixed device such as a PC (Personal Computer), vehicle mounted device, etc. The UE can perform communication through 3GPP spectrum such as LTE and/or non-3GPP spectrum such as WiFi, public safety spectrum, etc.

RAN (Radio Access Network): a unit including NodeB, eNodeB and RNC (Radio Network Controller) for controlling NodeB and eNodeB in a 3GPP network. The RAN is present between a UE and a core network and provides connection to the core network.

MME (Mobility Management Entity): an EPS network node which performs mobility management (MM) and session management (SM).

HLR (Home Location Register)/HSS (Home Subscriber Server): a database including subscriber information of a 3GPP network. HSS can perform configuration storage, identity management and user state storage, etc.

PDN-GW (Packet Data Network-Gateway)/PGW: an EPS network node which performs UE IP address assignment, packet screening and filtering, charging data collection, etc.

SGW (Serving Gateway): an EPS network node which performs mobility anchoring, packet routing, idle mode packet buffering, triggering an MME to page a UE, etc.

PCRF (Policy and Charging Rule Function): an EPS network node which performs policy decision for dynamically applying QoS (Quality of Service) and charging policy discriminated per service flow.

OMA DM (Open Mobile Alliance Device Management): a protocol which is designed to manage mobile devices such as cellular phones, PDA, portable computers, etc. and performs device configuration, firmware upgrade, error reporting, etc.

OAM (Operation Administration and Maintenance): a network management function set providing network defect indication, performance information, data and diagnosis function.

NAS (Non-Access Stratum): A higher stratum of a control plane between a UE and an MME. The NAS is a functional layer for signaling between a UE and a core network and exchanging a traffic message between the UE and core network in LTE/UMTS protocol stack and supports UE mobility and a session management procedure for establishing and maintaining IP connection between a UE and PDN GW.

NAS configuration MO (Management Object): a management object used to configure NAS functionality related parameters for a UE.

PDN (Packet Data Network): a network in which a server supporting a specific service (e.g. MMS (Multimedia Messaging Service) server, WAP (Wireless Application Protocol) server, etc.) is located.

PDN connection: a logical connection between a UE and a PDN, represented by one IP address (one IPv4 address and/or one IPv6 prefix).

APN (Access Point Name): a string for indicating or identifying a PDN. A requested service or network (PDN) is accessed through a corresponding PGW. A name (string) is pre-defined in the network to detect the PGW. For example, APN can be represented as internet.mnc012.mcc345.gprs.

AS (Access-Stratum): a stratum including a protocol stack between a UE and a radio network or between the UE and an access network and transmitting data and network control signals.

Lower layer failure: failure that cannot be corrected at AS level and is reported by the AS to the NAS. When the AS signals lower layer failure to the NAS, NAS signaling connection cannot be used.

PLMN (Public Land Mobile Network): a network configured to provide a mobile communication service to individuals. The PLMN can be configured per operator.

EPC (Evolved Packet Core)

FIG. 1 illustrates a configuration of an EPC.

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for audio and a packet-switched (PS) sub-domain for data. However, in 3GPP LTE evolved from third-generation mobile communication systems, CS and PS sub-domains are unified into one IP domain. That is, connection of terminals having IP capability can be established through a base station (e.g. eNodeB (evolved Node B)), EPC and application domain (e.g. IMS) in 3GPP LTE. That is, the EPC is an essential element for end-to-end IP services.

The EPC may include various components. FIG. 1 illustrates some of the components, that is, a SGW (Serving Gateway), PDN GW (Packet Data Network Gateway), MME (Mobility Management Entity), SGSN (Serving GPRS (General Packet Radio Service) Supporting Node) and ePDG (enhanced Packet Data Gateway).

The SGW operates as a boundary point between a radio access network (RAN) and a core network and maintains a data path between an eNodeB and the PDN GW. When a terminal moves over an area served by an eNodeB, the SGW functions as a mobile anchor point. That is, packets can be routed through the SGW for mobility in E-UTRAN (Evolved-UMTS (Universal Mobile Telecommunications System) Terrestrial Radio Access Network defined after 3GPP release-8). In addition, the SGW may function as an anchor point for mobility with respect to another 3GPP networks (RAN, for example, UTRAN or GERAN (GSM (Global System for Mobile Communication)/EDGE (Enhanced Data rates for Global Evolution) Radio Access Network defined after 3GPP release-8).

The PDN GW corresponds to a termination point of a data interface toward a packet data network. The PDN GW can support policy enforcement features, packet filtering, charging support, etc. In addition, the PDN GW may function as an anchor point for mobility management with respect to unreliable networks such as 3GPP and non-3GPP networks (e.g. I-WLAN (Interworking Wireless Local Area Network)) and reliable networks such as CDMA (Code Division Multiple Access) and WiMax networks.

While FIG. 1 shows that the SGW and PDN GW are configured as separate gateways, the two gateways may be implemented according to a single gateway configuration option.

The MME is an element which executes signaling and control functions for supporting terminal access for network connection, network resource allocation, tracking, paging, roaming and handover. The MME controls control plane functions related to subscriber and session management. The MME manages a large number of eNodeBs and performs signaling for selecting a conventional gateway for handover to other 2G/3G networks. In addition, the MME performs security procedures, terminal-to-network session handling, idle terminal location management, etc.

The SGSN handles packet data such as user mobility management and authentication with respect to other 3GPP networks (e.g. GPRS network).

The ePDG functions as a security node for unreliable non-3GPP networks (e.g. I-WLAN, Wi-Fi hotspot, etc.).

As described above with reference to FIG. 1, a terminal having IP capability can access an IP service network (e.g. IMS) provided by an operator via various elements in the EPC based on non-3GPP access as well as 3GPP access.

In addition, FIG. 1 shows various reference points (e.g. S1-U, S1-MME, etc.). In 3GPP, a conceptual link connecting two functions of different functional entities of an E-UTRAN and an EPC is defined as a reference point. Table 1 arranges the reference points illustrated in FIG. 1. Various reference points may be present according to network structure in addition to the reference points shown in Table 1.

TABLE 1

| Reference point | Description |
| --- | --- |
| S1-MME | Reference point for a control plane protocol between an E-UTRAN and an MME |
| S1-U | Reference point between an E-UTRAN and an SGW with respect to path switching between eNodeBs during handover and user plane tunneling per bearer |

TABLE 1-continued

| Reference point | Description |
|---|---|
| S3 | Reference point between an MME and an SGSN to provide user and bearer information exchange for mobility between 3GPP access networks in idle and/or active state (This reference point can be used in PLMN or between PLMNs (in the case of handover between PLMNs, for example).) |
| S4 | Reference point between an SGW and an SGSN to provide control related to 3GPP anchor functions of a GPRS core and the SGW and support mobility between the GPRS core and SGW. When a direct tunnel is not formed, this reference point provides user plane tunneling. |
| S5 | Reference point providing user plane tunneling between an SGW and a PDN GW and tunnel management. This reference point is used for SGW rearrangement when the SGW needs to be connected to the PDN GW which is not located with the SGW due to UE mobility and for required PDN connectivity. |
| S11 | Reference point between an MME and an SGW |
| SGi | Reference point between a PDN GW and a PDN. The PDN may be a common or private PDN outside an operator or a PDN inside the operator for providing IMS service. This reference point corresponds to Gi of 3GPP access. |

S2a and S2b from among the reference points shown in FIG. 1 correspond to non-3GPP interfaces. S2a is a reference point which provides reliable non-3GPP access, related control and mobility support between PDN GWs to a user plane. S2b is a reference point which provides related control and mobility support between the ePDG and the PDN GW to the user plane.

Figure 2:
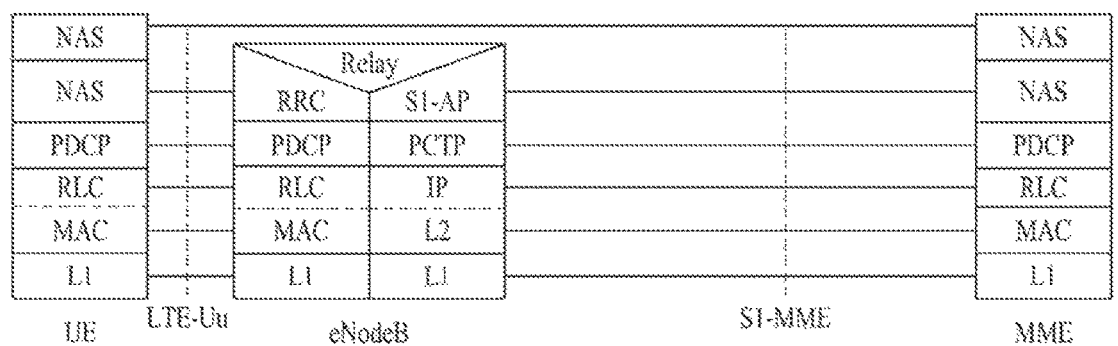
FIG. 2 illustrates a control plane for interface among a UE, an eNB and an MME.

FIG. 2 illustrates a control plane with respect to interfaces among a UE, an eNB and an MME.

The MME can perform access control for the UE that attempts access and an interface and protocol stack used therefor are as shown in FIG. 2. From among the interfaces shown in FIG. 2, a control plane interface between the UE and the eNB is defined as LTE-Uu and a control plane interface between the eNB and the MME is defined as S1-MME.

A NAS protocol forms a highest stratum in the control plane between the UE and the MME. The NAS protocol can support UE mobility management and session management to establish and maintain IP connectivity between the UE and PDN GW. In addition, the NAS protocol can define a rule for mapping of parameters with respect to mobility between systems and provide NAS security through NAS signaling message encryption and integrity protection.

An EMM (EPS Mobility Management) specific procedure may include an attach procedure, a detach procedure and a TAU (Tracking Area Update) procedure. An EMM connection management procedure may include a service request procedure.

Figure 3A:
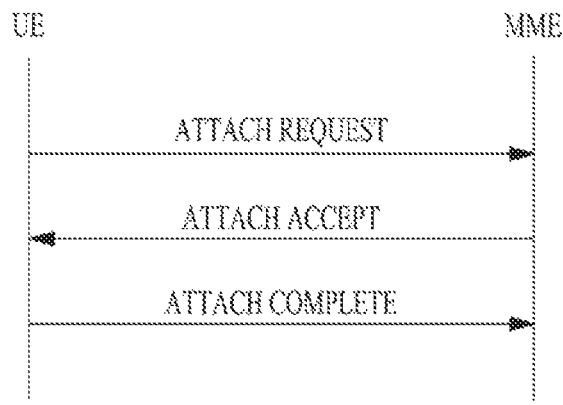
FIGS. 3(a) and 3(b) illustrate an attach procedure.
Figure 3B:
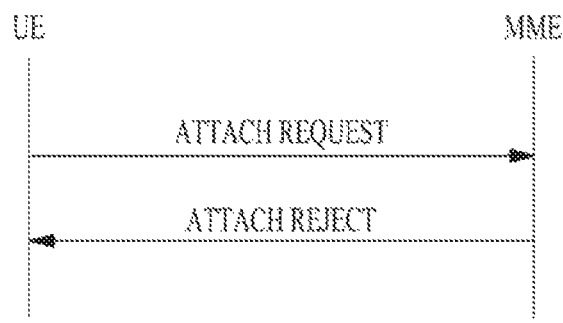

FIGS. 3(a) and 3(b) illustrate the attach procedure.

The attach procedure is used to attach a UE to an EPC for a packet service of the EPC. The attach procedure can be used for a case in which a UE operating in a PS mode attaches to an EPS service, a UE operating in a CS/PS mode attaches to both EPS and non-EPS services or a UE attaches for emergency bearer services.

Referring to FIG. 3(a), an EMM-deregistered UE may initiate an attach procedure by transmitting an attach request message to an MME. The UE may include EPS mobility identification information in the attach request message. When the attach request is granted in the corresponding network, the MME may transmit an attach accept message to the UE. In addition, the MME may provide information for instructing the UE to perform EPS bearer context activation to the UE. Upon reception of the attach accept message from the MME and EPS bearer context activation, the UE may transmit an attach complete message to the MME.

Referring to FIG. 3(b), when the attach request is not granted in the network although the UE has transmitted the attach request message to the MME, the MME may transmit an attach reject message to the UE. The attach reject message may include a value indicating the cause of attach rejection.

Figure 4A:
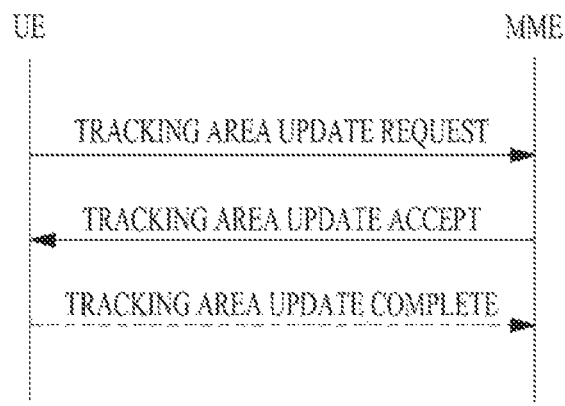
FIGS. 4(a) and 4(b) illustrate a TAU procedure.
Figure 4B:
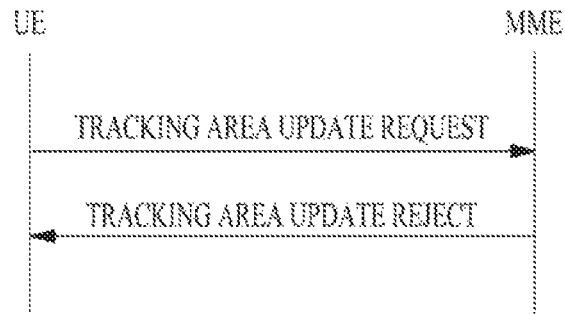

FIGS. 4(a) and 4(b) illustrate the TAU procedure.

TAU is always initiated by a UE and can be used to update registration of tracking area of the UE or to periodically notify the network of availability of the UE.

Referring to FIG. 4(a), an EMM-registered UE may initiate the TAU procedure by transmitting a TAU request message to the MME. For example, the TAU procedure can be initiated upon detecting that the UE has entered a tracking area which is not included in a tracking area list of the UE. When the TAU request is granted in the network, the MME may transmit a TAU accept message to the UE. If the MME allocates a new GUTI (Globally Unique Temporary Identifier) to the UE, then the GUTI can be included in the TAU accept message. Upon reception of the TAU accept message including the GUTI, the UE may transmit a TAU complete message to the MME as acknowledgement of the received GUTI.

Referring to FIG. 4(b), when the TAU request is not granted in the network although the UE has transmitted the TAU request message to the MME, the MME may transmit a TAU reject message to the UE. The TAU reject message may include a value indicating the cause of TAU rejection.

Figure 5A:
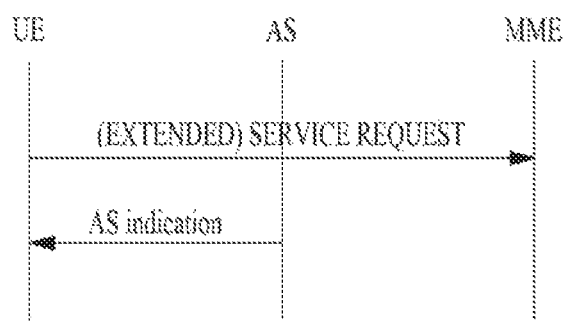
FIGS. 5(a) and 5(b) illustrate a service request procedure.
Figure 5B:
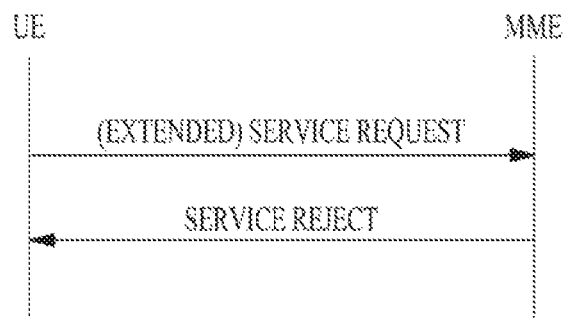

FIGS. 5(a) and 5(b) illustrate the service request procedure.

The service request procedure can be used to switch a UE in an EMM-idle mode to an EMM-connected mode and to establish radio bearer and S1 bearer such that uplink user data or signaling can be transmitted. In addition, the service request procedure may be used to operate mobile originated (MO)/mobile terminated (MT) CS fallback (CSFB). For example, the service request procedure can be used for cases in which a network has downlink signaling to be transmitted, a UE has uplink signaling to be transmitted and the UE or the network has user data to be transmitted while the UE is in the EMM-idle mode.

Referring to FIG. 5(a), the UE may initiate the service request procedure by transmitting a service request message or an extended service request message to the MME. Upon reception of the (extended) service request message, the MME may perform authentication and security mode control. Upon reception of indication that user plane radio bearer has been set and indication of system change from a lower layer (e.g. AS), the UE may process the indications as an indication that the service request procedure has been successfully completed. Accordingly, the UE can enter an EMM-registered state.

Referring to FIG. 5(b), when the (extended) service request message is not granted in the network although the UE has transmitted the message to the MME, the MME may transmit a TAU service reject message to the UE. The service reject message may include a value indicating the cause for rejection.

In the aforementioned NAS protocol (e.g. attach procedure, TAU procedure and/or service request procedure), a NAS signaling request may fail or be rejected due to lower layer (e.g. AS) failure or network failure, which will be described in detail later.

In the attach procedure, the following abnormal cases in the UE can be identified.

a) When access is barred because of access class barring or NAS signaling connection establishment rejection by the network If access is barred for "signaling", then the attach procedure is not started. The UE stays in the current serving cell and applies the normal cell reselection process. The attach procedure is started when access for "signaling" is granted on the current cell or when the UE moves to a cell where access for "signaling" is granted.

b) When NAS signaling connection is released or lower layer failure is generated before the attach accept message or the attach reject message is received The attach procedure is aborted, and the UE may proceed as described below.

c) In case of T3410 timeout

T3410 is started when the attach request message is transmitted and can be set to 15 seconds, for example. The UE aborts the attach procedure and proceeds as described below. The NAS signaling connection is released.

d) When the attach reject message includes other EMM cause values than #3, #6, #8, #11, #35, #12, #13, #14, #15, #22 and #25 and the UE considers EMM cause value #22 as an abnormal case Upon reception of EMM cause value #19 "ESM failure", if the UE is not configured for NAS signaling low priority, the UE may set an attach attempt counter to 5. Upon reception of EMM cause values #95, #96, #97, #99 and #111, the UE needs to set the attach attempt counter to 5. The UE may proceed as described below.

Here, EMM cause value #3 indicates an illegal UE, #6 indicates illegal mobile equipment (ME), #7 indicates that EPS service is not granted, #8 indicates that EPS service and non-EPS service are not granted, #11 indicates a non-granted PLMN, #35 indicates that a requested service option is not authorized in the corresponding PLMN, #12 indicates a non-granted tracking area, #13 indicates that roaming is not granted in the corresponding tracking area, #14 indicates that EPS service is not granted in the corresponding PLMN, #15 indicates that an appropriate cell is not present in a tracking area, #22 indicates congestion, and #25 indicates that a corresponding CSG (closed subscriber group) is not authorized. These values are exemplary EMM cause values when an attach request is not granted by the network.

The case in which the UE considers EMM cause value #22 as an abnormal case corresponds to cases other than a case in which the attach reject message includes a predetermined timer (e.g. T3346 corresponding to an MM backoff timer set when NAS level MM congestion control is activated, MM signaling is normally barred during operation of T3346) and the timer is set to a non-zero value and is not deactivated.

e) In the case of change of cell into a new tracking area

If a cell change into a new tracking area occurs before the attach procedure is completed, the attach procedure is aborted and immediately re-initiated. If a tracking area border is crossed when the attach accept message has been received but before an attach complete message is sent, then the attach procedure is re-initiated. When a GUTI has been allocated during the attach procedure, the GUTI is used in the attach procedure.

f) When mobile originated (MO) detach is required

The attach procedure is aborted, and a UE initiated detach procedure is performed.

g) In the case of detach procedure collision

When the UE in an EMM-registered-initiated sate receives a detach request message from the network and the detach type indicates "re-attach not required", the detach procedure progresses and the attach procedure is aborted. Otherwise the attach procedure progresses and the detach request message is ignored.

h) When a lower layer indicates attach request message transmission failure

The UE restarts the attach procedure.

i) When a lower layer indicates attach complete message transmission failure

If the current TAI is not included in a TAI list, then the UE restarts the attach procedure. If the current TAI is still in the TAI list, it is determined whether the ongoing procedure is re-run according to UE implementation. An EMM sublayer may notify an ESM sublayer that the ESM message in the ESM message container information element of the attach complete has failed to be transmitted.

j) When an activate default bearer context request message combined with the attach accept is not accepted by the UE due to failure in a UE ESM sublayer The UE initiates the detach procedure by sending a detach request message to the network. Further UE behavior is implementation specific.

k) When a lower layer indicates that an S101 mode to S1 mode handover has been cancelled (i.e. S101 mode only)

The UE aborts the attach procedure and enters EMM-DEREGISTERED.NO-CELL-AVAILABLE state.

l) When a lower layer indicates "extended wait time"

The UE stops the MM backoff timer (e.g. T3346) if it is running The MM backoff timer is started with the value provided by a lower layer in the "extended wait time" and the state is changed to EMM-DEREGISTERED.ATTEMPT-ING-TO-ATTACH state. The UE aborts the attach procedure, resets an attach attempt counter, stays in the current serving cell and applies the normal cell reselection process. The UE may proceed as described below.

m) When the MM backoff timer T3346 is running

The UE does not start the attach procedure unless the UE needs to attach for emergency bearer services. The UE stays in the current serving cell and applies the normal cell reselection process.

Here, it is considered an abnormal case if the UE needs to initiate an attach procedure while timer T3346 is running independently of whether timer T3346 has been started due to an abnormal case or an unsuccessful case.

For the cases b), c), and d), the UE proceeds as follows. Timer T3410, which is started when the attach request message is transmitted, is stopped if still running The attach attempt counter is incremented, unless already set to 5.

If the attach attempt counter is less than 5, the UE operates as follows. For the cases l) and m), the attach procedure is started, if still necessary, when timer T3346 expires or is stopped. For all other cases, timer T3411 (i.e. timer which is started in the case of attach failure or TAU failure due to lower layer failure or attach rejection or TAU rejection due to other EMM cause values than abnormal cases and stopped when an attach request or a TAU request is transmitted) is started and the state is changed to EMM-DEREGISTERED.ATTEMPTING-TO-ATTACH state. When timer T3411 expires, the attach procedure is restarted if still required by the ESM sublayer.

When the attach attempt counter is equal to 5, the UE operates as follows. The UE deletes a GUTI, TAI list, last visited registered TAI, list of equivalent PLMNs and KSI (Key Set Identifier) if present. In addition, the UE sets the update status to NOT UPDATED (e.g. EU2) and starts timer T3402 (i.e. timer which is started when the attempt counter is 5 in the case of attach failure or TAU failure and stopped when an attach request or a TAU request is transmitted). The state may be changed to EMM-DEREGISTERED.ATTEMPTING-TO-ATTACH state or optionally to EMM-DEREGISTERED.PLMN-SEARCH state in order to perform PLMN selection.

When A/Gb mode or Iu mode (i.e. a mode using interfaces for accessing a core network defined in GERAN system prior to 3GPP release-8) is supported by the UE, the UE additionally deletes RAI (Routing Area Identity), P-TMS (Packet Temporary Mobile Subscriber Identity), P-TSMI signature, equivalent PLMN lest and GPRS ciphering key sequence number if present when a normal attach procedure fails and the attach attempt counter is equal to 5. In addition, the UE sets the update status to NOT UPDATED (e.g. GU2) and starts timer T3302 (i.e. timer which is started when the attempt counter is greater than 5 in the case of GPRS attach failure or RAU failure and stopped when a GPRS attach request or an RAU request is transmitteD). The state may be changed to GMM-DEREGISTERED.ATTEMPTING-TO-ATTACH state or optionally to GMM-DEREGISTERED.PLMN-SEARCH state in order to perform PLMN selection.

In the TAU procedure, the following abnormal cases can be identified in the UE.

a) When access is barred because of access class barring or NAS signaling connection establishment rejection by the network When access is barred for "signaling", the TAU procedure is not started. The UE may stay in the current serving cell and apply the normal cell reselection process. The TAU procedure can be started when access for "signaling" is granted on the current cell or when the UE moves to a cell where access for "signaling" is granted and if still necessary.

b) When NAS signaling connection is released or lower layer failure is generated before the TAU accept message or the TAU reject message is received The TAU procedure is aborted, and the UE may proceed as described below.

c) In the case of T3430 timeout

T3430 is started when the TAU request message is transmitted and can be set to 15 seconds, for example. The UE aborts the TAU procedure and proceeds as described below. The NAS signaling connection is released.

d) When the TAU reject message includes other EMM cause values than #3, #6, #7, #9, #10, #11, #35, #12, #13, #14, #15, #22, #25 and #40 and the UE considers EMM cause value #22 as an abnormal case Upon reception of EMM cause values (e.g. #95, #96, #97 and #99) indicating protocol error, the UE needs to set the TAU attempt counter to 5. The UE may proceed as described below.

Here, EMM cause value #3 indicates an illegal UE, #6 indicates illegal mobile equipment (ME), #9 indicates that UE identification information is not derived from the network, #10 indicates implicit detach, #11 indicates non-granted PLMN, #35 indicates that a requested service option is not authorized in the corresponding PLMN, #12 indicates a non-granted tracking area, #13 indicates that roaming is not granted in the corresponding tracking area, #14 indicates that EPS service is not granted in the corresponding PLMN, #15 indicates that an appropriate cell is not present in a tracking area, #22 indicates congestion, #25 indicates that a corresponding CSG (closed subscriber group) is not authorized, and #40 indicates that activated EPS bearer context is not present. These values are exemplary EMM cause values when a TAU request is not granted by the network.

The case in which the UE considers EMM cause value #22 as an abnormal case corresponds to cases other than a case in which the TAU reject message includes a predetermined timer (e.g. T3346 corresponding to an MM backoff timer set when NAS level MM congestion control is activated, MM signaling is normally barred during operation of T3346) and the timer is set to a non-zero value and is not deactivated.

e) In the case of cell change into a new tracking area

If a cell change into a new tracking area occurs before the TAU procedure is completed, then the TAU procedure is aborted and immediately re-initiated. The UE sets the EPS update status to NOT UPDATED (e.g. EU2).

f) When the TAU procedure and the detach procedure collide

If the UE receives a detach request message with detach type "re-attach not required" with EMM cause values other than EMM cause value #2 indicating "IMSI unknown in HSS" or detach type "re-attach required" before the TAU procedure has been completed, then the TAU procedure is aborted and the detach procedure progresses.

If the UE receives a detach request message with detach type "re-attach not required" with EMM cause value #2 indicating "IMSI unknown in HSS" or detach type "IMSI detach" before the TAU procedure has been completed, then the detach request message is ignored and the TAU procedure progresses.

g) When the TAU procedure and GUTI reallocation procedure collide

If the UE receives a GUTI reallocation command message before the TAU procedure has been completed, then the message is ignored and the TAU procedure progresses.

h) When a lower layer indicates TAU request message transmission failure

The TAU procedure is aborted and re-initiated immediately. The UE sets the EPS update status to NOT UPDATED (e.g. EU2).

i) When a lower layer indicates TQU complete message transmission failure with TAI change If the current TAI is not on the TAI list, then the TAU procedure is aborted and immediately re-initiated. The UE sets the EPS update status to NOT UPDATED (e.g. EU2). If the current TAI is still part of the TAI list, it is determined whether the ongoing procedure is re-run according to UE implementation.

j) When a lower layer indicates TAU complete message transmission failure without TAI change It is determined whether the ongoing procedure is re-run according to UE implementation.

k) When a lower layer indicates "extended wait time", the UE stops an MM backoff timer (e.g. T3346) if it is running. The MM backoff timer is started with the value provided by the lower layer in the "extended wait time", the EPS update status is set to NOT UPDATED (e.g. EU2) and changed to EMM-REGISTERED.ATTEMPTING-TO-UPDATE state. The UE aborts the TAU procedure, resets the TAU attempt counter, stays in the current serving cell and applies the normal cell reselection process. The UE may proceed as described below.

l) When MM backoff timer T3346 is running, the UE does not start the TAU procedure unless the UE is establishing a PDN connection for emergency bearer services, has a PDN connection for emergency bearer services established or is in EMM-CONNECTED mode. The UE stays in the current serving cell and applies the normal cell reselection process.

Here, it is considered an abnormal case if the UE needs to initiate a TAU procedure while timer T3346 is running independently of whether timer T3346 has been started due to an abnormal case or an unsuccessful case.

For cases b), c), d), e), and k), the UE stops any ongoing transmission of user data.

For cases b), c), d), k) and l), the UE proceeds as follows:
Timer T3430 is stopped if still running For cases b), c) and d), the TAU attempt counter is incremented, unless it was already set to 5.

If the TAU attempt counter is less than 5, the TAI of the current serving cell is included in the TAI list, the EPS update status is UPDATED (e.g. EU1) and TIN (Temporary Identity used in Next update) does not indicate "P-TMSI", then the UE operates as follows. The UE keeps the EPS update status to EU1 and enters EMM-REGISTERED-.NORMAL-SERVICE state. The UE starts timer T3411 (i.e. timer which is started in the case of attach failure or TAU failure due to lower layer failure or attach rejection or TAU rejection due to other EMM cause values than abnormal cases and stopped when an attach request or a TAU request is transmitted). If the TAU request indicates "periodic updating", the timer T3411 may be stopped when the UE enters EMM-CONNECTED mode. If timer T3411 expires, the TAU procedure is triggered again.

If the TAU attempt counter is less than 5, the TAI of the current serving cell is not included in the TAI list or the EPS update status is different from EU1 or the TIN indicates "P-TMSI", the UE operates as follows. For cases k) and l), the TAU procedure is started, if still necessary, when timer T3346 expires or is stopped. For all other cases, the UE starts timer T3411, sets the EPS update status to NOT UPDATED (e.g. EU2) and changes the state to EMM-REGISTERED.ATTEMPTING-TO-UPDATE state. When timer T3411 expires, the TAU procedure is triggered again. If A/Gb mode or Iu mode is supported by the UE, the UE starts the timer T3311 (i.e. timer which is started in the case of RAU rejection and stopped when RA is changed or RAU process is initiated), sets GPRS update status to NOT UPDATED (e.g. GU2) and changes that state to GMM-REGISTERED.ATTEMPTING-TO-UPDATE state for the abnormal case when a normal or periodic RAU process fails, the RAU attempt counter is less than 5 and the GPRS update status is different from UPDATED (e.g. GU1).

If the TAU attempt counter is equal to 5, then the UE operates as follows. The UE starts timer T3402 (i.e. timer which is started when the attempt counter is equal to 5 in the case of attach failure or TAU failure and stopped when an attach request or a TAU requesat is transmitted), sets the EPS update status to NOT UPDATED (e.g. EU2), deletes the list of equivalent PLMNs and changes to EMM-REGISTERED.ATTEMPTING-TO-UPDATE state or optionally to EMM-REGISTERED.PLMN-SEARCH state in order to perform PLMN selection.

If A/Gb mode or Iu mode is supported by the UE, then the UE starts timer T3302 (i.e. timer which is started when the attempt counter is greater than 5 in the case of GPRS attach failure or RAU failure and stopped when a GPRS attach request or a RAU requesat is transmitted), deletes the list of equivalent PLMNs, sets the GPRS update state to NOT UPDATED (e.g. GU2) and changes to GMM-REGISTERED.ATTEMPTING-TO-UPDATE state or optionally to GMM-REGISTERED.PLMN-SEARCH state in order to perform PLMN selection when a normal or periodic RAU procedure fails and the RAU attempt counter is greater than 5.

In the service request procedure, the following abnormal cases can be identified in the UE.

a) When access is barred because of access class barring or NAS signaling connection establishment rejection by the network If the service request procedure is started in response to a paging request from the network, then access class barring is not applicable.

When the response to the paging request from the network triggers the service request procedure and NAS signaling connection establishment is rejected by the network, the service request procedure is not started. The UE stays in the current serving cell and applies a normal cell reselection process. The service request procedure may be started if the service request procedure is still necessary, i.e. when access for "terminating calls" is granted or because of cell change.

If the service request is initiated for CSFB, access is barred for "MO (mobile originated) CSFB" and the lower layer indicates "the barring is due to CSFB specific access barring information", then the service request procedure is not started. The UE stays in the current serving cell and applies the normal cell reselection process. The service request procedure may be started if the service request procedure is still necessary, i.e. when access for "mobile originating CSFB" is granted or because of cell change.

If the service request is initiated for CSFB, access is barred for "MO CSFB" and the lower layer does not indicate "the barring is due to CSFB specific access barring information", then the UE selects GERAN or UTRAN radio access technology (RAT). The UE then proceeds with appropriate MM and CC (Call Control) specific procedures. The EMM sublayer does not indicate abortion of the service request procedure to the MM sublayer.

Otherwise, if access is barred for "originating calls", then the service request procedure is not started. The UE stays in the current serving cell and applies a normal cell reselection process. The service request procedure may be started if the service request procedure is still necessary, i.e. when access for "originating calls" is granted or because of cell change.

If the service request is initiated for 1×CSFB and access is barred for "originating calls", then the UE selects cdma2000® 1×radio access technology RAT). The UE then proceeds with appropriate cdma2000® 1×CS procedures.

b) When NAS signaling connection is released or lower layer failure occurs before the service request procedure is completed or before the service reject message is received If the service request is initiated for CSFB, then the UE selects GERAN or UTRAN radio access technology (RAT). The UE then proceeds with appropriate MM and CC specific procedures. The EMM sublayer does not indicate abortion of the service request procedure to the MM sublayer.

If the service request is initiated for 1×CSFB, the UE may select cdma2000® 1× RAT and proceed with appropriate cdma2000® 1×CS procedures or perform cell selection.

Otherwise, the UE enters EMM-REGISTERED state. The UE aborts the service request procedure, stops timer T3417 or T3417ext (i.e. timer which is started when an (extended) service request is transmitted) and stopped when bearer is established or a service reject message is received) and releases any resources allocated for the service request procedure.

c) When timer T3417 expires

The UE enters the EMM-REGISTERED state.

If the UE triggers the service request procedure from EMM-IDLE mode, then the EMM sublayer aborts the procedure and releases any resources allocated for the service request procedure.

If the UE triggers the service request procedure from EMM-CONNECTED mode, then the EMM sublayer aborts the procedure and considers that the 1×CSFB procedure has failed. The UE stays in EMM-CONNECTED mode.

d) When timer T3417ext expires

The UE enters the EMM-REGISTERED state.

If the UE triggers the service request procedure from EMM-IDLE mode, then the EMM sublayer aborts the procedure, indicates to the MM sublayer that the CSFB procedure has failed and releases any resources allocated for the service request procedure.

If the UE triggers the service request procedure from EMM-CONNECTED mode, then the EMM sublayer aborts the procedure and indicates to the MM sublayer that the CSFB procedure has failed. The UE stays in EMM-NNECTED mode.

e) When the service reject message includes other EMM cause values than #3, #6, #7, #9, #10, #11, #35, #12, #13, #15, #18, #22, #25, #39 and #40 and when the UE considers EMM cause #22 as an abnormal case The UE aborts the procedure and enters EMM-REGISTERED state.

If the service request is initiated for CSFB, then the UE selects GERAN or UTRAN as an RAT. The UE then proceeds with appropriate MM and CC specific procedures. The EMM sublayer does not indicate abortion of the service request procedure to the MM sublayer.

If the service request is initiated for 1×CSFB, then the UE selects cdma2000® 1×RAT. The UE then proceeds with appropriate cdma2000® 1×CS procedures.

If the service request is initiated for 1×CSFB and the UE has dual Rx/Tx configuration and supports enhanced 1×CSFB, then upon entering EMM-IDLE mode the UE performs the TAU procedure.

Here, EMM cause value #3 indicates an illegal UE, #6 indicates illegal mobile equipment (ME), #9 indicates that UE identification information is not derived from the network, #10 indicates implicit detach, #11 indicate non-granted PLMN, #35 indicates that a requested service option is not authorized in the corresponding PLMN, #12 indicates a non-granted tracking area, #13 indicates that roaming is not granted in the corresponding tracking area, #15 indicates that an appropriate cell is not present in a tracking area, #18 indicates that CS domain is not available, #22 indicates congestion, #25 indicates that a corresponding CSG (closed subscriber group) is not authorized, #39 indicates that CS service is temporarily unavailable, and #40 indicates that activated EPS bearer context is not present. These values are exemplary EMM cause values when the service request is not granted by the network.

The case in which the UE considers EMM cause value #22 as an abnormal case corresponds to cases other than a case in which the TAU reject message includes a predetermined timer (e.g. T3346 corresponding to an MM backoff timer set when NAS level MM congestion control is activated, MM signaling is normally barred during operation of T3346) and the timer is set to a non-zero value and is not deactivated.

f) When the TAU procedure is triggered

The UE aborts the service request procedure, stops timer T3417 or T3417ext if the timer is running and performs the TAU procedure. An "active" flag is set in the TAU request message. If the service request is initiated for CSFB or 1×CSFB, then the UE sends the extended service request message to the MME by using the existing NAS signaling connection after the completion of the TAU procedure.

g) In the case of switch off

If the UE is in EMM-SERVICE-REQUEST-INITIATED state at switch off, then the detach procedure is performed.

h) When procedure collision occurs

When UE receives a detach request message with detach type "re-attach not required" with EMM cause other than #2 indicating "IMSI unknown in HSS" or detach type "re-attach required" from the network in EMM-SERVICE-REQUEST-INITIATED state, then the detach procedure progresses and the service request procedure is aborted.

Additionally, if the service request is initiated for CSFB or 1×CSFB, then the EMM sublayer indicates to the MM sublayer or cdma2000® upper layers that the CSFB or 1×CSFB procedure has failed.

If the detach type information element in the detach request message indicates "re-attach required", then the attach procedure is performed.

When the UE receives a detach request message with detach type "re-attach not required" with EMM cause other than #2 indicating "IMSI unknown in HSS" or detach type "IMSI detach" from the network in EMM-SERVICE-REQUEST-INITIATED state, the UE progress both the service request procedure and the detach procedure.

i) When a lower layer indicates service request message or extended service request message transmission failure with TAI change If the current TAI is not in the TAI list, then the service request procedure is aborted to perform the TAU procedure. The "active" flag is set in the TAU request message. If the service request is initiated for CSFB or 1×CSFB, then the UE sends the extended service request message to the MME by using the existing NAS signaling connection after the completion of the TAU procedure.

If the current TAI is still part of the TAI list, then the UE restarts the service request procedure.

j) When a lower layer indicates service request message or extended service request message transmission failure without TAI change The UE restarts the service request procedure.

k) When default or dedicated bearer setup fails

If the lower layers indicate radio bearer setup failure, then the UE deactivates the EPS bearer.

l) When a lower layer indicates "extended wait time"

The UE aborts the service request procedure, enters EMM-REGISTERED state, and stops timer T3417 or T3417ext if the timer is still running.

The UE stops timer T3346 if it is running

The UE starts timer T3346 according to an "extended wait time" value provided by the lower layer.

The service request procedure is started if still necessary, when timer T3346 expires or is stopped.

If the service request is initiated for CSFB and timer T3246 (i.e. MM backoff timer for CS domain) is not running, then the UE selects GERAN or UTRAN as RAT. The UE then proceeds with appropriate MM and CC specific procedures. The EMM sublayer does not indicate abortion of the service request procedure to the MM sublayer.

If the service request is initiated for 1×CSFB, then the UE selects cdma2000® 1×RAT. The UE then proceeds with appropriate cdma2000® 1×CS procedures or perform cell selection.

m) When timer T3346 is running

The UE does not start the service request procedure unless the UE has PDN connection for emergency bearer services established or is establishing PDN connection for emergency bearer services, or the UE is requested by an upper layer for a CSFB for emergency call.

The UE stays in the current serving cell and applies normal cell reselection process. The service request procedure is started, if still necessary, when timer T3346 expires or is stopped.

Upon request of an upper layer for MO CSFB which is not for an emergency call, if timer T3246 is not running, then the UE may select GERAN or UTRAN as RAT. The UE then proceeds with appropriate MM and CC specific procedures. The EMM sublayer does not indicate abortion of the service request procedure to the MM sublayer.

Upon request of the upper layer for CSFB for an emergency call, the UE selects GERAN or UTRAN as an RAT. The UE then proceeds with appropriate MM and CC specific procedures. The EMM sublayer does not indicate abortion of the service request procedure to the MM sublayer.

Upon request of the upper layer for 1×CSFB, the UE selects cdma2000® 1×RAT. The UE then proceeds with appropriate cdma2000® 1×CS call procedures.

Radio Link Failure (RLF)

RLF may occur between base stations (e.g. between an (e)NB or H(e)NB and a terminal (e.g. UE or MS). RLF refers to a state in which signal transmission and reception are difficult to perform since quality of a radio link between a base station and a terminal is deteriorated. Operation related to RLF detection is performed in the RRC layer and a procedure of discovering a new radio link is carried out upon detection of RLF.

In 3GPP LTE, RRC (Radio Resource Control) state can be defined as RRC_CONNECTED state and RRC_IDLE state. The RRC_CONNECTED state refers to a state in which RRC connection is established between a base station and a terminal and the terminal can transmit/receive data to/from the base station in the RRC_CONNECTED state. The RRC_IDLE state refers to a state in which RRC connection between the base station and the terminal is released.

RLF related operations correspond to (1) detection of physical layer problems in the RRC-CONNECTED state, (2) recovery of physical layer problems and (3) RLF detection.

(1) Upon reception of consecutive "out-of-sync" indications corresponding to a predetermined value defined as N310 from a lower layer (e.g. PHY layer or MAC layer), a UE drives a timer defined as T310. The "out-of-sync" indications can be provided to a higher layer (e.g. layer higher than the RRC layer) when a PDCCH (Physical Downlink Control Channel) received by a higher layer (physical layer) cannot be demodulated or SINR (Signal-to-Interference plus Noise Ratio) is low. N310 and T310 can be provided as predetermined values as higher layer parameters.

(2) Upon reception of "in-sync" indications which are consecutive by a predetermined value defined as N311 from the lower layer during operation of the T310 timer, the UE stops the T310 timer. N311 can be provided as a predetermined value as a higher layer parameter.

(3) The UE determines that RLF has been detected upon expiration of the T310 timer and initiates a connection re-establishment procedure. Expiration of the T310 timer means that the T310 timer reaches a predetermined time T310 without being stopped during operation. The connection re-establishment procedure refers to a procedure in which the UE sends an "RRC connection re-establishment request" message to the base station, receives an "RRC connection re-establishment" message from the base station and transmits an "RRC connection re-establishment complete" message to the base station. Refer to subclause 5.3.11 of 3GPP standard document TS36.3331 for details of RLF related operations.

Enhanced NAS Signaling Request Procedure

When some or all NAS signaling requests (e.g. attach request, TAU/RAU request, service request, etc.) of a UE fail or are rejected by a network node (e.g. MME), as described above, the UE can operate according to cause values of NAS signaling request failure/rejection. For example, the UE can reattempt the NAS signaling requests. Here, the upper bound of reattempts can be set to 5 in the case of attach request and TAU request. That is, the attach attempt counter or TAU attempt counter can be incremented per failure and the maximum value can be limited to 5. In the case of service request, the upper bound of the number of attempts is not determined and the service request is defined in such a manner that the service request is reattempted after a standby timer.

A NAS signaling request may fail or be rejected due to lower layer failure (e.g. AS failure) or network failure (e.g. RLF detection, generation of abnormal network problems or problems of a core network) in 3GPP LTE/UMTS based mobile communication systems. Here, lower layer failure related to NAS signaling request failure/rejection refers to failure at the AS level. In case of network failure related to NAS signaling request failure/rejection, RLF can occur due to deteriorated state of a radio access network between a UE/MS and an eNB/HeNB and abnormal network problems can be generated due to failure of NAS signaling connection between an eNB/HeNB and an MME/SGSN.

The present invention provides a method for improving inefficiency of conventional procedures when a NAS signaling request fails or is rejected since lower layer failure and/or network failure occurs.

For example, when an uplink signal is weak while a downlink signal is strong or when both the uplink signal and the downlink signal are weak, a NAS signaling request from a UE may not arrive at a base station (eNB or HeNB) and/or an MME. In this case, the NAS signaling request initiated by the UE may fail or may be rejected by the corresponding network. In addition, when a network error is generated due to PLMN failure or network failure, the NAS signaling request initiated by the UE may fail or may be rejected by the network.

According to the conventional procedures, when a NAS signaling request fails or is rejected, the UE/MS reattempts the NAS signaling request procedure (in the case of attach request or TAU request, for example) or applies a standby timer (in the case of the service request procedure) for the same RAT and/or the same PLMN. That is, the UE/MS reattempts the NAS signaling request or applies the standby timer while staying in the same RAT and/or the same PLMN (i.e. without changing the RAT to another RAT or selecting another PLMN). In this case, if the corresponding network failure cannot be recovered within a short time, services for users may be considerably delayed.

Specifically, in an abnormal case in the UE in the NAS signaling request procedure as described above, a counter value increases and attach reattempt/TAU reattempt is performed when the attach attempt counter or TAU attempt counter is less than 5. In the case of service request, service request is reattempted after waiting for the standby timer (e.g T3417 or T3417ext).

In addition, even when a NAS signaling request is granted by the network, part of the NAS signaling request may fail. For example, although the NAS signaling request procedure has been successfully performed for the EPS, MSC may not be reachable temporarily, network failure caused by PLMN failure may occur or the CS domain may not be available (for example, EMM cause value #16, #17 or #18 indicating EPS-only success). In this case, the UE/MS performs NAS signaling request reattempt until the upper limit of the attempt counter according to the conventional procedures.

When the NAS signaling request is not granted by the network, cause values #13, #14 and #35 of a reject message for the NAS signaling request correspond to a case in which the NAS signaling request is rejected due to roaming protocol and problems related to subscriber information although the cause values do not indicate network failure/lower layer failure. In this case, PLMN reselection and RAT change are immediately performed without reattempt counting according to the conventional procedures. However, since the NAS signaling request rejection is caused by subscriber information related problems rather than network failure/lower layer failure, the method for solving problems due to network failure/lower layer failure according to the present invention needs to be discriminated from the method for solving service delay problems due to service request procedure reattempt or waiting.

According to the aforementioned conventional procedures, NAS signaling request reattempt is performed or the standby timer is applied when the NAS signaling request fails or is rejected due to network failure or lower layer failure. However, if network failure is so severe that recovery within a short time is not possible, it can be considered that there is no possibility that the NAS signaling request is granted by the network even if the NAS signaling request procedure is reattempted or the standby timer is applied. Accordingly, it is necessary to define operation of the UE/MS to immediately perform RAT change or PLMN reselection without NAS signaling request procedure reattempt or waiting when the NAS signaling request fails or is rejected due to network failure or lower layer failure. This can prevent the UE/MS from performing NAS signaling request reattempt whenever the NAS signaling request fails or is rejected due to network failure/lower layer failure, prevent unnecessary consumption of network resources by enabling the UE/MS to immediately perform RAT change/PLMN reselection and solve problems of delaying service provided to users.

Embodiment 1

When a NAS signaling request (e.g. attach, TAU/RAU, service request, etc.) fails or is rejected by the network due to lower layer failure or network failure, the UE/MS can immediately perform RAT change or PLMN reselection, or simultaneously carry out RAT change and PLMN reselection. Here, the network failure includes CS failure, PS failure or both CS failure and PS failure. The network failure may be caused by at least one of RLF, network abnormal cases or core network problems. An embodiment of the present invention will now be described.

1) In the case of attach request or TAU/RAU request, the UE/MS performs PLMN reselection and/or RAT change after attempting the upper bound (e.g. 5) of the attempt counter.

2) While the upper bound of the attempt counter is not applied in the conventional service request procedure, the upper bound is applied to the service request procedure in the present invention. For example, an attempt counter having a predetermined upper bound can be applied or a period in which the service request procedure is performed can be set, similarly to the attach procedure of TAU/RAU procedure. Accordingly, the UE/MS can perform PLMN reselection and/or RAT change after carrying out the service request procedure until the upper bound of the attempt counter is reached.

3) Even when the value of the attempt counter of the UE/MS is less than the upper bound, the UE/MS updates (or sets) the attempt counter value to the upper bound without performing reattempt. That is, the UE/MS can perform operation (i.e. RAT change and/or PLMN reselection) corresponding to the upper bound of the attempt counter without the upper bound attempts.

1), 2) and 3) may be independently applied or one or more thereof may be simultaneously applied.

For example, when NAS signaling request filature or rejection occurs due to network failure, the UE/MS can perform RAT change and/or PLMN selection without carrying out attempts or waiting (i.e. without setting the attempt counter to the upper bound (e.g. 5) for the attach procedure or TAU/RAU procedure and without applying the standby timer for the service request procedure) in the attach procedure, TAU/RAU procedure or service request procedure.

Furthermore, the aforementioned operation when the attempt counter value is set to the upper bound in an abnormal case of the UE/MS can be additionally performed as an operation when the attempt counter value is set to the upper bound in the present invention. That is, the UE can set the EPS update status to NOT UPDATED (e.g. EU2), delete a GUTI, last visited registered TAI, eKSI and a list of equivalent PLMNs if present, and then change to EMM-DEREGISTERED.PLMN-SEARCH state to perform PLMN selection. In addition, when the UE supports A/Gb mode or Ui mode, the UE can set the GPRS update status to NOT UPDATED (e.g. GU2) and delete RAI, P-TMSI, P-TSMI signature and a GPRS ciphering key sequence number if present.

Embodiment 2

As described in embodiment 1, the UE/MS can perform RAT change and/or PLMN selection when NAS signaling request failure or rejection occurs due to lower layer failure or network failure. In this case, it can be assumed that a different RAT is selected in the same PLMN as that of a cell in which network failure has occurred or a PLMN equivalent to the PLMN of the cell is selected. In addition, the UE/MS, which has selected the different RAT, may return to the cell in which network failure has occurred according to AS reselection (e.g. RAT change). Here, if the network failure is severe and thus cannot be solved within a short time, the network failure is not overcome even if the UE/MS returns to the previous RAT/PLMN and thus the NAS signaling request of the UE/MS may fails/be rejected again. In this case, while the UE/MS can immediately perform RAT change/PLMN selection and be served by another RAT/PLMN, as described in embodiment 1, the procedure in which the UE/MS returns to RAT/PLMN having problems may be repeated. This problem may be referred to as a Ping-Pong problem due to network failure. The present embodiment proposes a method for solving the Ping-Pong problem.

1) In the case of NAS signaling request failure or rejection due to lower layer failure or network failure, the UE/MS can start a predetermined timer (i.e. RAT/PLMN selection related timer) when selecting a different RAT in the same PLMN or selecting a different RAT in an equivalent (or different) PLMN. That is, the RAT/PLMN selection related timer can be defined as a timer related to selection of an RAT and/or a PLMN other than the current RAT and PLMN in which network failure occurs (i.e. selection of an RAT other than the current RAT of a PLMN other than the current PLMN, the same RAT of the other PLMN or the other RAT of the same PLMN). That is, the RAT/PLMN selection related timer can be understood as a timer for preventing the UE/MS from selecting the current RAT+PLMN in which network failure occurs during operation of the timer. Since the possibility of network failure recovery needs to be considered even though network failure is so severe thus recovery within a short time is not possible, the value of the RAT/PLMN selection related timer can be appropriately set. That is, the timer can be set to a value at which network failure recovery is expected. In addition, the UE can disable LTE capability during operation of the RAT/PLMN selection related timer and re-enable LTE capability upon expiration of the RAT/PLMN selection related timer.

2) While the UE can select another RAT and/or another PLMN and disable LTE capability when the NAS signaling request fails or is rejected due to lower layer failure or network failure, as described in 1), the UE may select the previous RAT and the previous PLMN and re-enable LTE capability when predetermined conditions are satisfied. The predetermined conditions may include power off/on of the UE, network operation mode change, etc. for PLMN selection.

3) If NAS does not select a non-equivalent PLMN, a lower layer (i.e. AS) can consider the LTE cell status as barred for a period of time (e.g., similar procedure for a not-allowed CSG cell). The AS can reselect another RAT or cell based on a ranking algorithm thereof instead of NAS disabling all LTE cells.

1), 2) and 3) may be independently applied and one or more thereof may be simultaneously applied.

For example, when a NAS signaling request fails or is rejected due to network failure, the UE/MS can set the attempt counter to the upper bound (e.g. 5) thereof and start the RAT/PLMN selection related timer in attach request, TAU/RAU and service request procedures. During operation of the RAT/PLMN selection related timer, the UE/MS can select an RAT and/or a PLMN from RATs and/or PLMNs other than the RAT and/or PLMN (i.e. current RAT and PLMN) in which NAS signaling request failure/rejection occurs.

Figure 6:
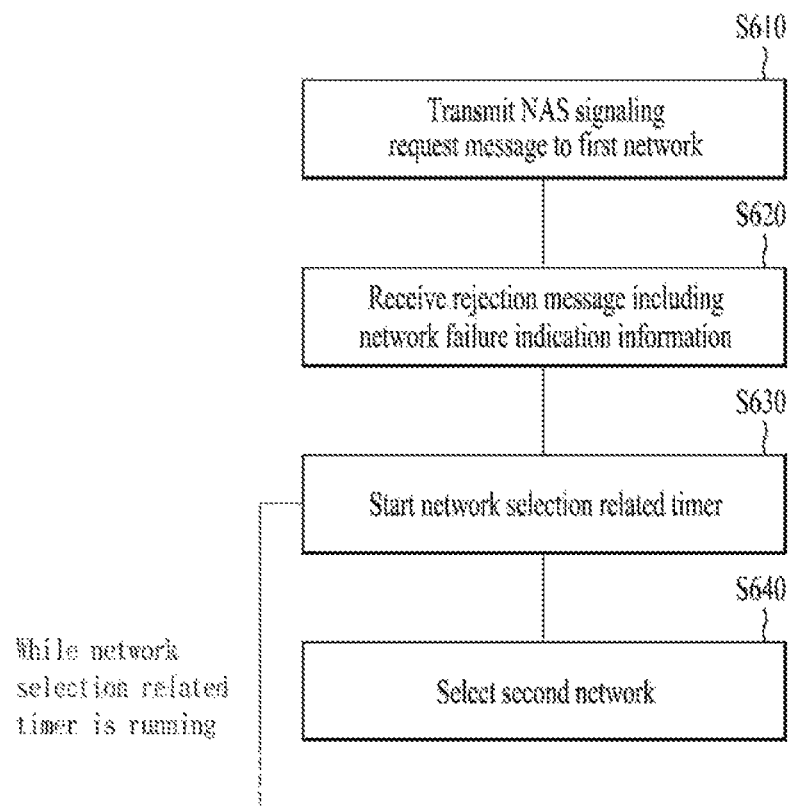
FIG. 6 is a flowchart illustrating a method for performing a NAS signaling procedure according to an embodiment of the present invention.

FIG. 6 is a flowchart illustrating a method for performing a NAS signaling procedure according to an embodiment of the present invention.

A UE may transmit a request message (e.g. attach request, TAU request, RAU request or service request message) to a network node (e.g. MME) of a first network in step S610.

The UE may receive a message (e.g. attach reject, TAU reject, RAU reject or service reject message) including information indicating network failure in the first network from the network node of the first network in step S620. While FIG. 6 shows reception of a reject message which indicates network failure, the UE may receive a NAS signaling request failure message which indicates lower layer failure in step S620.

The UE may start a network selection related timer in step S630 and select a second network during operation of the timer in step S640. Here, the network selection related timer may correspond to the RAT/PLMN selection related timer described in embodiment 2. That is, the UE can select a new RAT and/or a new PLMN from network candidates other than a combination of the current RAT and PLMN in which network failure occurs.

The above-described embodiments of the present invention can be independently applied or two or more embodiments can be simultaneously applied.

Figure 7:
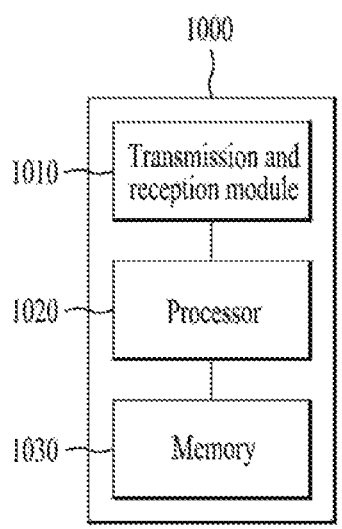
FIG. 7 illustrates a configuration of a UE according to an embodiment of the present invention.

FIG. 7 illustrates a configuration of a UE according to an embodiment of the present invention.

Referring to FIG. 7, a UE 1000 according to the present invention may include a transmission and reception module 1010, a processor 1020 and a memory 1030. The transmission and reception module 1010 may be configured to transmit signals, data and information to an external device (e.g. network node, another UE, server, eNB or the like) and to receive signals, data and information from an external device (e.g. network node, another UE, server, eNB or the like). The processor 1020 may be configured to control overall operations of the UE 1000 and to process information which is transmitted/received by the terminal 1000 to/from the external device. The memory 1030 may store processed information for a predetermined time and be replaced by a component such as a buffer (not shown).

The UE according to an embodiment of the present invention may be configured to perform a NAS signaling procedure. The processor 1020 may be configured to receive a first message including information which indicates network failure from the network node of the first network using the transmission and reception module 1010. In addition, the processor 1020 may start a network selection related timer and select a second network from network candidates other than the first network while the network selection related timer is running.

The configuration of the UE 1000 may be implemented such that the above-described embodiments of the present invention are independently applied or two or more embodiments are simultaneously applied and description of redundant parts is omitted for clarity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit data to and receive data from the processor via various known means.

The detailed description of the preferred embodiments of the present invention is given to enable those skilled in the art to realize and implement the present invention. While the present invention has been described with reference to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

INDUSTRIAL APPLICABILITY

The above-described embodiments of the present invention are applicable to various mobile communication systems.

The invention claimed is:

1. A method for performing a non-access stratum (NAS) signaling procedure by a UE (User Equipment) in a wireless communication system, the method comprising,
   transmitting, by the UE, an attach request message to a first network of a first radio access technology (RAT) in a first public land mobile network (PLMN), wherein the first RAT of the first network is Long Term Evolution (LTE);
   receiving, by the UE, an attach reject message informing network failure, in response to the attach request message,
   starting, by the UE, a network selection related timer after receiving the attach reject message; and
   selecting, by the UE, a second network from among network candidates, while the network selection related timer is running,
   wherein the network candidates include a second RAT in the first PLMN, a first RAT in a second PLMN and a second RAT in the second PLMN, and
   wherein at least one of the network candidates includes an LTE RAT.

2. The method according to claim 1, wherein the attach reject message is a rejection message informing that the NAS signaling procedure requested through the attach request message is not granted by a network.

3. The method according to claim 1, wherein a RAT of the first network is LTE (Long Term Evolution).

4. A user equipment (UE) configured to perform a non-access stratum (NAS) signaling procedure in a wireless communication system, comprising:
   a transmitting device and a reception device; and
   a processor configured to:
   transmit an attach request message to a first network of a first radio access technology (RAT) in a first public land mobile network (PLMN) via the transmitting device, wherein the first RAT of the first network is Long Term Evolution (LTE);
   receive an attach reject message informing network failure, in response to the attach request message via the reception device,
   start a network selection related timer after receiving the attach reject message; and
   select a second network from among network candidates, while the network selection related timer is running,
   wherein the network candidates include a second RAT in the first PLMN a first RAT in a second PLMN and a second RAT in the second PLMN, and
   wherein at least one of the network candidates includes an LTE RAT.

5. The user equipment according to claim 4, wherein the attach reject message is a rejection message informing that the NAS signaling procedure requested through the attach request message is not granted by a network.

6. The user equipment according to claim 4, wherein a RAT of the first network is LTE (Long Term Evolution).

* * * * *